Feb. 1, 1966 H. C. KENDALL ETAL 3,233,084
METHODS AND APPARATUS FOR OBTAINING TRAFFIC DATA
Filed Dec. 27, 1960 6 Sheets-Sheet 1
FIG. IA.
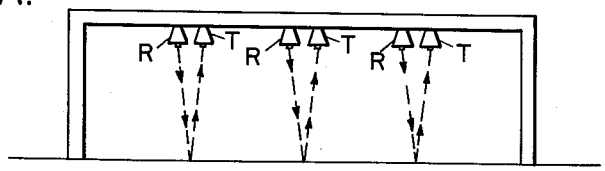
FIG. IB.
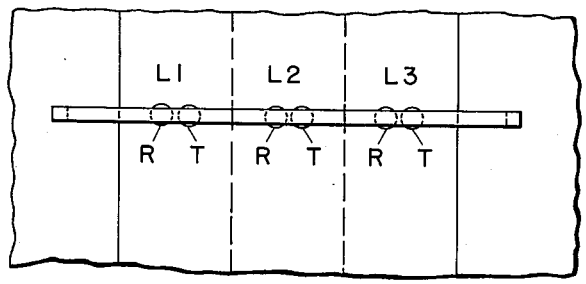
FIG. 2.
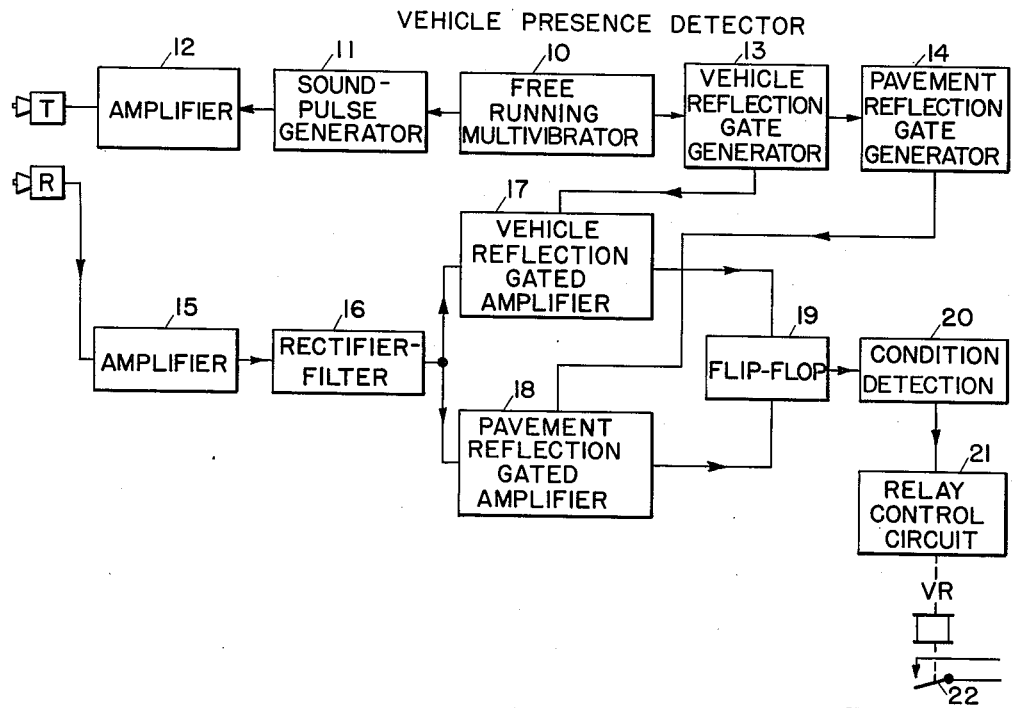
INVENTORS.
H.C. KENDALL AND
J.H. AUER JR.
BY
Forest B. Hitchcock
THEIR ATTORNEY Feb. 1, 1966  H. C. KENDALL ETAL  3,233,084
METHODS AND APPARATUS FOR OBTAINING TRAFFIC DATA
Filed Dec. 27, 1960  6 Sheets-Sheet 3

INVENTORS.
H.C. KENDALL AND
J.H. AUER JR.
BY
THEIR ATTORNEY

Feb. 1, 1966 H. C. KENDALL ETAL 3,233,084
METHODS AND APPARATUS FOR OBTAINING TRAFFIC DATA
Filed Dec. 27, 1960 6 Sheets-Sheet 5

STOPPAGE RELAY CONTROL

VEHICLE LENGTH MEASUREMENT

INVENTORS.
H.C. KENDALL AND
J.H. AUER JR.
BY
*Forest B. Hitchcock*
THEIR ATTORNEY

Feb. 1, 1966  H. C. KENDALL ETAL  3,233,084
METHODS AND APPARATUS FOR OBTAINING TRAFFIC DATA
Filed Dec. 27, 1960  6 Sheets-Sheet 6

INVENTORS.
H.C. KENDALL AND
J.H. AUER JR.
BY
*Forest B. Hitchcock*
THEIR ATTORNEY

3,233,084
METHODS AND APPARATUS FOR OBTAINING TRAFFIC DATA

Hugh C. Kendall and John H. Auer, Jr., Rochester, N.Y., assignors to General Signals Corporation
Filed Dec. 27, 1960, Ser. No. 78,410
19 Claims. (Cl. 235—150.24)

This invention relates to methods and apparatus for automatically obtaining traffic information for the study of traffic conditions and the automatic or manual control of the highway and particularly relates to methods and apparatus for determining traffic lane occupancy, volume, "flow velocity," and the like.

Analysis of traffic conditions on highways, over bridges, and through tunnels, etc., leads to the conclusion that it is vital to have up-to-the-minute information on a number of different factors which, taken together, are capable of indicating when traffic conditions are approaching certain maximums. With this information, it is possible to take remedial steps such as by diverting traffic away from a clogged artery or by temporarily halting the flow of vehicles about to enter a tunnel. It has been found in actual practice that the availability of this information and its use by slowing the rate at which vehicles enter a tunnel, for example, can result in a substantial increase in the total number of vehicles that may use that tunnel within a given span of time. The consequence of this is that such facilities are used much more efficiently, and this makes it possible at times to delay or even eliminate the building of additional facilities with consequent large savings.

The method and apparatus for the study or traffic conditions of the present invention is concerned, in part, with providing a measure of the traffic lane occupancy, i.e., the portion of the highway which is vehicle-occupied. When no vehicles are passing along a highway lane, for example, the traffic lane occupancy is zero, but it approaches 100% when the vehicles are also bumper-to-bumper along the stretch of road. Information is also desired as to the traffic volume, which factor is not necessarily related to traffic lane occupancy; for example, when vehicles are moving with a substantial spacing between them but a relatively high speed, the traffic lane occupancy may be low but the traffic volume may nevertheless be quite high. On the other hand, when vehicles are bumper-to-bumper but are not moving for some reason or another, the traffic lane occupancy is substantially 100%, but the traffic volume under those conditions is 0%.

Another valuable factor in traffic analysis is what may be termed "flow velocity." This is somewhat akin to average velocity and is also important since it provides an approximation as to the velocity of traffic flow past a given point.

Under some conditions, it is also desirable to provide data as to vehicle length for the individual vehicles passing a detection point. This data may be useful as giving an indication of the percentage of vehicles which constitute trucks.

Described briefly, the present invention is based upon the use of apparatus which provides an output analog whose duration is proportional, for each vehicle, to the length of time that it taken that vehicle to pass a given detection point. The vehicle detector providing this data may thus be termed a "presence" detector in that is provides a distinctive output whose duration corresponds to the length of time required for the vehicles to pass the point, as opposed to other known types of detectors which provide an output which is the same for each vehicle and is independent of the time required for the vehicle to pass the detection point.

The apparatus of this invention which provides the traffic lane occupancy data, in effect, averages the above-mentioned output of the detector with the result that an analog is obtained whose magnitude is directly proportional to the length of time that it takes the vehicle to pass a given point. This latter analog is a close approximation of the traffic lane occupancy in that it approximately represents that portion of the total pavement which is occupied by vehicles.

For obtaining traffic volume data, the present invention utilizes again the output of the vehicle detector, but this time it merely uses the output of such detector as a triggering input to a circuit which then provides an output which is the same for all vehicles, as, for example, a square wave pulse of voltage. The successive output pulses produced by a succession of vehicles passing the detection point are filtered and averaged so that the resultant signal has its amplitude proportional to the number of vehicles passing the detection point in a unit of time.

With respect to the "flow velocity" data, an output signal is obtained from speed measuring apparatus which may be of the Doppler frequency type and with said output comprising a voltage whose amplitude is proportional to the speed of each vehicle. This speed signal is stored and retained after the passage of that vehicle and until a second vehicle passes the detection point at which time the speed of the second vehicle is ascertained and the corresponding speed signal replaces that stored for the preceding vehicle. The stored signal is applied to a low pass filter so that the output thereof which is made available for use on a meter or the like represents "flow velocity." The resulting signal closely approximates average vehicle speed when there are a number of vehicles passing the detection point in relatively close succession and at reasonably uniform time intervals. However, since the last measured speed is stored continually until another vehicle comes along, it is clear that the signal under those conditions does not necessarily represent true average vehicle velocity, but the data thus obtained is nonetheless highly useful since it tends to indicate the existing conditions of vehicle utilization of the highway.

Under certain conditions, it is higly desirable to know that a vehicle stoppage has occurred. It may well occur that, under heavy traffic conditions, there will be a complete stoppage of traffic. Since no vehicles then pass the detection point and if there happens to be no vehicle in the detector field, the vehicle detection apparatus would then indicate a complete absence of any traffic. Apparatus for detecting the existence of such conditions is also disclosed herein so that information is immediately available to indicate that traffic is completely blocked.

Where apparatus is provided for measuring vehicle speed directly, as by the use of Doppler speed measuring apparatus, it then becomes possible also to use such data to provide a measure of vehicle length. Thus, if there is an analog available which represents the instantaneous speed of each passing vehicle, and if there is a further analog available which represents the length of time required for the vehicle to pass the detection point, then the multiplication of these two analogs, respectively representing speed and time, give a resultant which is proportional to the length of each vehicle, i.e., length=velocity×time. The factor representing time is, in this instance, obtained from the output of the vehicle detector which, as previously mentioned, comprises a signal of predetermined amplitude whose duration corresponds to the length of time required for the vehicle to pass the detection point; therefore, upon integration of this latter signal, another analog is obtained whose amplitude is proportional to this desired time interval. The multiplication of these two analogs in a multiplying circuit provides a measure of the length of the vehicle.

In apparatus providing data as to traffic conditions, it is often desirable to provide data which represents generally the speed of movement of traffic along the highway, and this data does not necessarily need to represent precisely the exact velocity of each individual vehicle. Such velocity data can, of course, be provided by using apparatus specifically provided for this purpose, such as Doppler speed measuring apparatus. It is, however, desirable to be able to provide this velocity data without having to make use of such extra speed measuring equipment. This may be accomplished by utilizing the factors of vehicle length and also the time required for the vehicle to pass the detection point. Division of analogs of these two quantities provide a measure of vehicle speed, i.e., velocity=length/time.

The time analog is readily available, of course, by use of the vehicle presence detector since, as already mentioned. It is merely necessary to integrate its output to obtain an analog whose amplitude is proportional to the length of time required for the vehicle to pass the detection point. With respect to vehicle length data, statistical information may be utilized to obtain an approximation of this. Although automomibles do vary rather considerably in length, statistical data may be prepared to show that for a relatively large sample of vehicles such as might be expected in ordinary traffic flow, a representative analog may be employed which corresponds to some assumed vehicle length. It is recognized this analog is particularly in error when a truck is the particular vehicle which is the subject of speed measurement. However, as is hereinafter disclosed, it is readily possible to separately detect trucks on the basis of their greater height. In other words, when a vehicle of greater height, representative of a truck, is detected, it is then possible to select an analog of vehicle length which will correspond to some average truck length.

Therefore, it is an object of this invention to provide traffic data apparatus which will continuously indicate the lane occupancy of traffic passing a fixed point.

It is another object of this invention to provide traffic lane occupancy apparatus receiving as an input an analog having a characteristic which is proportional to the length of time for each successive vehicle to pass a given detection point.

It is another object of this invention to provide a traffic volume detector which will continuously provide a signal representative of the number of vehicles passing a given test point within a given period of time.

A further object is to provide a traffic volume detector which utilizes as its input signal an analog from a vehicle detector having a characteristic which is proportional to the length of time required for each successive vehicle to pass a given detection point.

It is a further object to provide a "flow velocity" detector whose output will continually represent the velocity of traffic flow past a given detection point.

It is a further object to provide apparatus for indicating that there is a stoppage of traffic.

It is still another object to provide apparatus for measuring the length of successive vehicles passing a given detection point.

Another object is to provide vehicle speed measuring apparatus which operates in response to one input signal representative of vehicle length and another input signal representative of the time required for that vehicle to pass a particular detection point.

Another object is to provide a novel method for determining traffic lane occupancy.

Another object is to provide a novel method for determining traffic volume.

An additional object is to provide a novel method for measuring traffic velocity.

Still another object is to provide a novel method for determining vehicle length.

Other objects, purposes and characteristic features of this invention will in part be obvious from the accompanying drawings and in part pointed out as the description of the invention progresses.

To simplify the illustration, the various parts and circuits constituting the various embodiments of the invention are shown diagrammatically and certain conventional circuits and elements are illustrated in block form. The symbols (B+) and (B−) represent sources of voltage of positive and negative polarity, respectively, with the symbol for a ground connection indicating an intermediate tap between the positive and negative terminals.

In describing the invention in detail, reference will be made to the accompanying drawings in which like reference characters designate corresponding parts throughout the several views and in which:

FIGS. 1A and 1B illustrate a possible arrangement of vehicle detection apparatus over the adjacent lanes of a typical highway;

FIG. 2 illustrates in block form a vehicle detector of the "presence" detection type which may be used in connection with the apparatus of this invention;

*General description*

Figure 3:
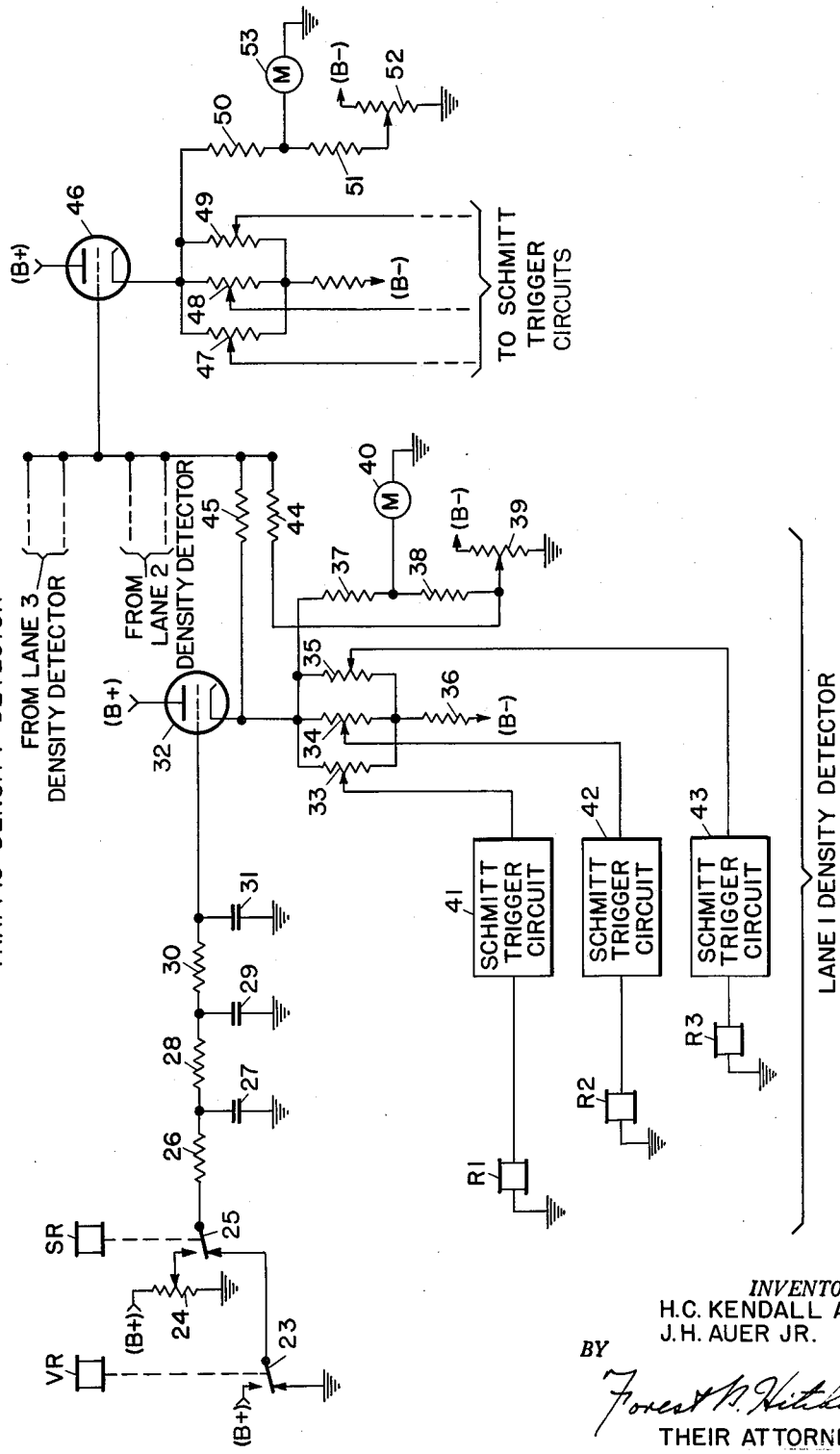
FIG. 3 illustrates the circuit of a traffic lane occupancy computer.

FIGS. 1A and 1B illustrate a possible arrangement of the vehicle detection apparatus, including the transducers, for each of three parallel highway lanes and particularly where the vehicle detection apparatus is of the pulsed ultra-sonic type. In a vehicle detection system of this type, which is disclosed in detail in our prior application Serial No. 808,736, filed April 24, 1959, now Patent No. 3,042,303, repetitive sound pulses, each of short duration such as one millisecond, are transmitted downwardly from a transmitting transducer T toward the pavement and impinge, in the absence of any vehicle, upon the surface of the roadway. They are then reflected back toward a receiving transducer. When a vehicle passes along that lane and intercepts the relatively narrow beam of sound pulses which are generated and transmitted from the transmitting transducer, the sound pulses can no longer impinge upon the pavement but then impinge upon the upper sound reflecting surfaces of the vehicle. Incidentally, the repetition rate of the pulses is sufficiently slow to provide enough time between successive pulses to permit a pavement reflection to be received by the receiving transducer before the next sound pulse is transmitted. This latter requirement eliminates ambiguity since each reflection pulse is then definitely related to the last transmitted sound pulse. There are of course other ways of accomplishing this general purpose, such as alternately transmitting pulses of two different frequencies, to effectively interlace cycles and thereby increase the pulse repetition frequency and the resolution.

*Vehicle presence detector—FIG. 2*

In FIGURE 2 the apparatus provided for generating the repetitive sound pulses comprises the free-running multivibrator 10 whose frequency of operation establishes the pulse repetition rate. For each cycle of its operation, the multivibrator 10 applies a triggering pulse to the sound pulse generator 11. The generator 11 then produces a brief pulse of ultrasonic frequency energy which is amplified by amplifier 12 and applied to the transmitting transducer T.

The round-trip propagation time of a reflection pulse is affected considerably by whether or not there is a vehicle present within the sound beam. When no vehicle is present, each sound pulse has the maximum propagation time, but when a vehicle is present the propagation time is considerably reduced. Electronic gating circuits are employed and each demarcates a successive time interval. The first of these gating circuits, the vehicle reflection gate generator 13, demarcates a time interval which encompasses that period of time after the transmission of each sound pulse when a vehicle reflection can be expected to be received. Another subsequent time interval is demarcated by the pavement reflection gate generator 14 and encompasses the interval of time during which a pavement reflection can be expected to be received.

The reflection pulses are all amplified by amplifier 15, and after being rectified and filtered by the rectifier-filter 16, are applied to both the vehicle reflection gated amplifier 17 and a pavement reflection gated amplifier 18. These two amplifiers are respectively gated by the voltages derived from the gate generators 13 and 14 previously referred to. As a result, when no vehicle is present, each transmitted sound pulse results in a corresponding output from the pavement reflection gating amplifier 18, and this output is then applied to one input of flip-flop 19. Similarly, when a vehicle is within the sound beam, each transmitted sound pulse produces an output from the gating amplifier 17, and this is then applied to the other input of flip-flop 19.

Flip-flop 19 is, therefore, in one of its two stable states whenever no vehicle is present so that it receives successive input pulses from amplifier 18. Flip-flop 19 is operated to its opposite state, however, when a vehicle is within the sound beam so that it receives successive input pulses from amplifier 17. Condition detector 20 is connected to flip-flop 19 and senses which of its two states flip-flop 19 is in at any time. Whenever condition detector 20 senses that flip-flop 19 is in that condition which is assumes whenever it is constantly receiving output pulses from amplifier 18, it then acts upon relay control circuit 21 to cause relay VR to be dropped away so that front contact 22 of this relay is open. On the other hand, when condition detector 20 is in the opposite of its two states by reason of having sensed that flip-flop 19 is in the condition it necessarily assumes whenever it receives successive pulses from amplifier 17, then relay control circuit 21 is operated to the condition where relay VR is picked up. At such time, front contact 22 of relay VR is closed.

From this description it can be seen that the vehicle detector described in FIGURE 2 is of the type which is a "presence" detector in that relay VR is picked up throughout the time that a vehicle is detected as being within the sound beam. The various component values and time constants associated with this detector are so chosen that the response and release time for relay VR will be substantially identical. This is done so that the picked up time of relay VR will tend to be closely proportional to the length of time that the vehicle is within the sound beam.

Another distinctive characteristic of the vehicle detector of FIGURE 2 is that it provides a high degree of discrimination against spurious objects. More specifically, in order for a vehicle to be detected, it is first necessary that the normally received pavement reflections be no longer received and that concurrently therewith vehicle reflection pulses be received. Before the apparatus can be restored to its normal condition so that it can there- after again detect a subsequent vehicle, it is necessary that the vehicle reflections cease and that the pavement reflections again be restored. These multiple requirements ensure that only a vehicle will ordinarily provide operation of the detector relay VR. Moreover, a convertible automobile having sound reflecting surfaces only at its front hood and rear deck portions cannot possibly be counted as two separate vehicles, since the absence of pavement reflection pulses when the cloth top is within the sound beam prevents the detector relay VR from dropping away. These characteristics of the vehicle detector of FIGURE 2 are fully set forth in our prior application Serial No. 808,736, referred to previously. In addition, the prior application of J. H. Auer, Jr., Serial No. 820,325, filed June 15, 1959, now Patent No. 3,045,909, dated July 25, 1962, may be referred to for a detailed description of the mode of operation of the flip-flop 19, condition detector 20, and relay control circuit 21.

Although the vehicle detector of FIGURE 2 is disclosed as being of the pulses ultrasonic type, it is to be emphasized that it is by no means essential that a vehicle detector of this particular type be used. It is only necessary that the detector generally be of the type which will provide an output for each vehicle whose duration is proportional to the length of time that the vehicle requires to pass a given point, i.e., in this case, to pass through the detection zone defined by the beam of repetitive sound pulses.

*Traffic lane occupancy detector—FIG. 3*

The traffic lane occupancy detector of FIGURE 3 utilizes a contact 23 of vehicle relay VR. When no vehicle is detected as being within the sound beam, back contact 23 is closed and, since back contact 25 of relay SR is normally closed as will later be described, capacitor 27 is discharged to ground through resistor 26. If it is assumed that back contact 23 has been closed for some substantial length of time, then capacitors 27, 29 and 31 will all be fully discharged and there will be zero voltage on the grid of tube 32.

As above explained, the relay VR is picked-up when a vehicle is being detected and is released during the absence of a vehicle. (B+) is thus applied through front contact 23 during the presence of a vehicle, and zero voltage is applied during the absence of a vehicle to the filter network including capacitors 27, 29 and 31 and resistors 26, 28 and 30. The voltage waveform thus produced on this filter network by movable contact 23 is therefore rectangular in shape. The ratio of the average value of this waveform during any particular time interval to the (B+) value is in effect the ratio of occupied time to total time during the particular time interval. The average value of the waveform is obtained by passing the rectangular wave through a low pass filter consisting of three sections of resistance and capacitance. The voltage at the filter output then represents the average value of the rectangular wave. The effective time interval over which the average is taken is a function of the filter characteristics and is made adjustable by providing for manual variation of resistors 26, 28 and 30. As will later be demonstrated mathematically, the charge on capacitor 27, which corresponds closely to the average amplitude of the voltage on the heel of contact 23, is also closely related to the traffic lane occupancy, i.e., the percentage of highway occupied by vehicles.

The voltage across capacitor 27 is affected by each passing vehicle and it also decreases between successive vehicles as capacitor discharges through back contact 23; whereas, it is desired that the voltage representing traffic lane occupancy be more gradually variable and not vary widely with each passing vehicle. To accomplish this, additional low-pass filter sections, each generally similar to resistor 26 and capacitor 27, are provided. A total of three such sections are shown in FIGURE 3, the section after the first, which includes resistor 26 and capacitor 27, comprising, respectively, a series resistor 28 and shunt capacitor 29, and a third section comprising resistor 30 and shunt capacitor 31. The time constant of each filter section is made fairly long for the purpose of providing sufficient filtering to ensure that the voltage at the grid of the cathode follower tube 32 will vary smoothly with time rather than abruptly. It has additionally been found desirable in practice to select the circuit components in such a manner that each successive filter is of somewhat higher impedance than the previous one, since this tends to eliminate the loading of each section.

To demonstrate that the percentage of detection time provides a close approximation of traffic lane occupancy, it will be assumed that in time T, $n$ vehicles pass the detector and that their individual velocities are $v_1$, $v_2$, and $v_3 \ldots v_n$. Consequently, the average velocity of the $n$ vehicles=

$$V_A = \frac{V_1 + V_2 + V_3 \cdots + V_n}{n}$$

Throughout the predetermined observation time T, the average length L of the road which is occupied by the $n$ vehicles (together with the empty spaces between successive vehicles) is equal to the average velocity $v_A$ multiplied by the observation time T, i.e., $L = v_A \times T$. L, in other words, is the length of the segment of traffic scanned by the detector in time T when that traffic has an average velocity $v_A$.

If the length of road required to accommodate the $n$ vehicles when they are bumper-to-bumper is $L_s$, then $L_s = l_1 + l_2 + l_3 \ldots + l_n$ where $l$=vehicle length. Lane occupancy defined as fraction of the road covered is then equal to $$\frac{L_s}{L} = \frac{1}{v_A T}(l_1 + l_2 + l_3 \cdots l_n)$$

On the other hand, total detection time of the vehicle detector for the $$t = \frac{l_1}{v_1} + \frac{l_2}{v_2} + \frac{l_3}{v_3} \cdots + \frac{l_n}{v_n}$$

At the same time, percent detection time $t/T$, which is represented by the voltage appearing at the control grid of cathode follower tube 32 of FIGURE 3, may be expressed as follows:

$$\frac{t}{T} = \frac{1}{T}\left(\frac{l_1}{v_1} + \frac{l_2}{v_2} + \frac{l_3}{v_3} \cdots + \frac{l_n}{v_n}\right) = \frac{1}{v_A T}$$
$$\left(l_1 \cdot \frac{v_A}{v_1} + l_2 \cdot \frac{v_A}{v_2} + l_3 \cdot \frac{v_A}{v_3} \cdots l_n \cdot \frac{v_A}{v_n}\right)$$

A comparison of the equation for the percentage detection time with the equation for traffic lane occupancy reveals that they are generally similar and become identical when all of the vehicles travel at the same velocity since then $v_1 = v_2 = v_3 = v_n = v_A$. As the spread of vehicle velocities increases, accuracy tends to decrease. However, for a typical situation where vehicles are of varying lengths and with velocities not varying too widely, it has been found that the percentage of detection time as represented by the voltage at the grid of tube 32 very closely approximates the traffic lane occupancy as represented in the above equation.

That the voltage appearing at the control grid of cathode follower tube 32 of FIG. 3 represents percent detection time $t/T$ may be proven mathematically in the following manner:

Let capacitance of capacitor 27=C
Let resistance of resistor 26=R
Let B+ voltage amplitude=E
Let voltage on capacitor 27=$e_C$ Assume for each vehicle, relay VR is energized for time $t_a$, and total time between vehicle fronts is time $T_a$.

Assume the RC time constant of resistor 26 and capacitor 27 is of sufficient length that the charge and discharge current of capacitor 27 remains constant over time $t_a$ and $(T_a - t_a)$ respectively.

Let $Q_1$=charge added to capacitor 27 during time $t_a$
Let $I_1$=capacitor charging current during time $t_a$
Let $Q_2$=charge removed from capacitor 27 during time $(T_a - t_a)$
Let $I_2$=capacitor discharge current during time $(T_a - t_a)$
Therefore, $$Q_1 = \int_0^{t_a} I_1 dt = I_1 t$$

and $$Q_2 = \int_{t_a}^{T_a} I_2 dt = I_2(T_a - t_a)$$

But $$I_1 = \frac{E - e_C}{R}$$

and $$I_2 = \frac{e_C}{R}$$

Under stable traffic conditions, $Q_1 = Q_2$.

Hence $$\frac{E - e_C}{R} t_a = \frac{e_C}{R}(T_a - t_a)$$
$$E t_a = e_C T_a$$
$$e_C = E \frac{t_a}{T_a}$$

Through the predetermined observation time T, $n$ vehicles are observed. Thus, $$e_C = E \frac{t}{T}$$

proving that the voltage on capacitor 27 is a measure of traffic lane occupancy.

Accuracy in measurement of traffic lane occupancy becomes increasingly important for higher lane occupancy values since it is under such circumstances that it is ordinarily desired to take remedial measures. However, it is also at such time that there is the least likelihood that the speeds of individual vehicles will vary widely from the average speed. For this reason, measurement of the percentage of detection time provides increasingly accurate results for higher values of traffic lane occupancy.

As already mentioned, provision must be made for the situation when traffic has been entirely halted, since no vehicles will then pass the detector. If traffic should halt with no vehicle within the detection zone, it is clear that, under those circumstances, the voltage at the grid of tube 32 would eventually be reduced to zero by reason of the closure of back contact 23 of relay VR and zero density measurement would then be obtained at a time when traffic density was at or near the maximum. To take care of this situation, a stoppage relay SR is provided. This relay is normally dropped away so that its back contact 25 is closed and there can be no effect upon the grid voltage of tube 32. However, upon the detection of a stoppage condition in a manner to be described in detail below, relay SR picks up and closes its front contact 25 thereby connecting the left-hand terminal of resistor 26 to the variable tap on potentiometer 24, connected between (B+) and ground. When this occurs, a predetermined fixed voltage is applied to the filter sections and after a brief interval this same value of voltage appears at the grid of tube 32. The result is that a preselected voltage representing an artificial lane occupancy figure is applied to the grid of tube 32. This occupancy figure does not, of course, necessarily represent accurately the traffic lane occupancy existing at that time, but it is desirable to show an artificial, relatively high figure rather than to show zero traffic lane occupancy which would be entirely misleading.

The cathode circuit of tube 32 includes three parallel potentiometers 33, 34, and 35 and, in series therewith, a resistor 36 whose lower terminal is connected to (B—). The plate of tube 32 is connected directly to (B+). The cathode of the tube is also connected through series resistors 37 and 38 to a variable tap on potentiometer 39 whose upper terminal is connected to (B—) and whose lower terminal is grounded. The junction of resistors 37 and 38 is connected through a meter 40 to ground.

For zero traffic lane occupancy, the various capacitors of the filter network are entirely discharged so that the grid voltage of tube 32 is zero. It is typical of a cathode follower than its cathode will be slightly higher in potential than its control grid. Ordinarily, therefore, zero volts on the grid would give a positive voltage at the cathode so that the needle of meter 40 would be deflected. It is for this reason that a negative biasing network is provided in the cathode circuit which provides sufficient negative voltage at the tap of potentiometer 39 to offset the slightly positive voltage appearing at the cathode with the result that meter 40 has zero voltage applied to its terminals and will truly indicate zero traffic lane occupancy when there is zero voltage on the grid of the tube 32.

When traffic lane occupancy reaches some preselected high value which is to be arbitrarily represented as "100% density," a particular level of voltage then exists on the grid of tube 32. For this level of grid voltage, there is a respective voltage level appearing between the junction of resistors 37 and 38 and ground which will deflect the needle of meter 40 to a particular scale position which may then be represented as the "100% lane occupancy" position. In a similar manner, for a measured traffic lane occupancy of 50%, i.e. midway between the zero and 100% lane occupancy levels, the voltage which then appears on the grid of tube 32 is substantially midway between zero and that which existed at the grid for 100% lane occupancy. At such time, the meter 40 is deflected to a scale position which may be calibrated to "50% lane occupancy."

The variable tap on each of the cathode potentiometers 33–35 is connected to the input of a respective Schmitt trigger circuit 41, 42, and 43. The operation of such trigger circuits is well-known in the art and need not be further described here in detail. Briefly, such a trigger circuit is normally in one of two distinctive states but is operated to an opposite condition and is maintained in that condition as long as its input voltage is above some predetermined value. When this occurs, an output signal is obtained from the trigger circuit which may be utilized as shown in FIG. 3 to actuate a corresponding relay such as one of the relays R1–R3, respectively. The potentiometers 33–35 are so adjusted that the relays R1–R3 will operate for respectively different values of traffic lane occupancy. For example, potentiometer 33 may be so adjusted that trigger circuit 41 will be operated from its normal condition whenever traffic lane occupancy equals or exceeds 30%. The potentiometer 34 may be adjusted so that trigger circuit 42 will be operated from its normal condition and pick up relay R2 when traffic lane occupancy equals 60%. Relay R3 may similarly be operated at some other preselected traffic lane occupancy. The contacts of these relays may be used as desired for the control of related circuits.

The description thus far has concerned itself particularly with the vehicle detection and lane occupancy measuring apparatus associated with only one particular lane of traffic. FIGURES 1A and 1B illustrate that the invention may well be used to monitor traffic conditions for multiple lanes, and three such parallel lanes are illustrated. Where traffic conditions are to be monitored for multiple lanes, it is desirable to obtain the necessary data for each lane individually, but it is also desirable to obtain a composite figure which will represent traffic conditions for the multiple lanes as a whole. For this reason, a summing circuit may be employed, and this is illustrated in FIGURE 3 as comprising a cathode follower 46 which receives summing voltages from the particular traffic lane occupancy detector of FIGURE 3 and also receives voltages from the lane occupancy detectors of other lanes as well. As is shown, the voltage at the cathode of tube 32 is applied through a summing resistor 45 to the common summing point which connects directly to the control grid of tube 46. A connection is also made from the tap on potentiometer 39 and through resistor 44 to this summing point. The purpose of this latter connection is again to provide a negative voltage component which will offset the amount by which the cathode of tube 32 is more positive in voltage than the control grid.

The traffic lane occupancy apparatus for each of the other lanes also supplies a traffic lane occupancy voltage analog to the grid of tube 46 together with an offsetting negative component in a manner identical to that shown in FIG. 3 for the particular apparatus of lane 1 there shown. The voltage of the grid of tube 46 thus represents an average of the outputs of the lane occupancy detectors for the individual lanes being monitored.

The output circuit of tube 46 is virtually identical to that previously described in connection with tube 32. Therefore, meter 53 is energized by a voltage which is proportional to the amplitude of the voltage appearing at the grid of tube 46. The scale of this meter 53 is so calibrated that it will read 100% lane occupancy only when the voltage at the grid of tube 46 is at the maximum value it can achieve when all of the inputs it obtains from the individual lane occupancy detectors for the separate lanes are at their maximum values. In other words, meter 53 will only indicate 100% traffic lane occupancy when each of the individual lanes contributing to that value is experiencing 100% traffic lane occupancy. Similarly, meter 53 will indicate zero lane occupancy only when each of the individual lanes has zero traffic lane occupancy.

Three parallel potentiometers 47, 48, and 49 are also included in the cathode circuit of tube 46. The variable taps on these potentiometers are connected to individual Schmitt trigger circuits in a manner identical to that shown for the Schmitt triggers 41–43 included in the cathode circuit of tube 32. Each of such trigger circuits controls a respective relay, which relay then will be actuated from its normal condition for a particular traffic lane occupancy of the combined lanes.

Although the traffic lane occupancy detector of this invention has been particularly described in connection with the specific embodiment shown in FIG. 3, it should be understood that the actual apparatus employed may differ quite widely from that actually shown in FIG. 3. In fact, considering the present invention in its broader aspects, it may be said that there is disclosed herein a method for determining traffic lane occupancy and that this method comprises a first step of obtaining an analog having a duration proportional to the length of time required for each vehicle to pass a given detection point, and comprising the further step of filtering and averaging the aforementioned analog to obtain an analog whose amplitude represents the percentage of detection time, i.e. the percentage of time throughout an observation period within which a vehicle's presence is detected by the vehicle detector. The last-mentioned analog then has an amplitude which is closely proportional to traffic lane occupancy. Apparatus such as that shown in FIG. 3 is highly desirable because of the ease with which traffic density measurements may be made. Nevertheless, it is entirely conceivable that traffic lane occupancy measurements can, under simple conditions, be even provided by mental calculation in carrying out the aforesaid steps.

The invention is not thus to be limited to the specific apparatus disclosed but is to be considered as embracing also the method of obtaining traffic lane occupancy information which has been described.

Figure 4:
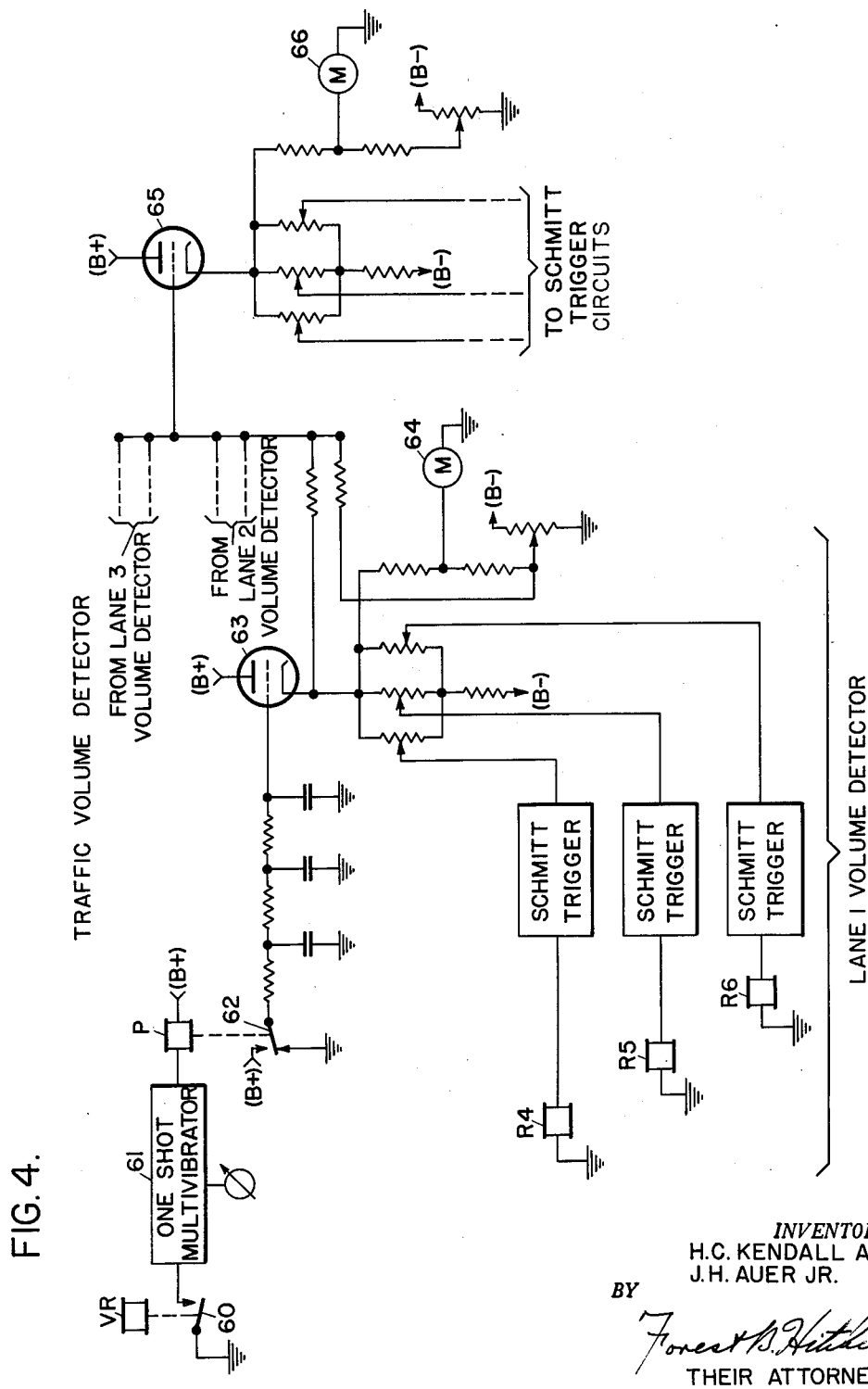
FIG. 4 illustrates the circuit for a traffic volume computer.

Traffic volume detector—FIG. 4

The traffic volume detector of FIG. 4 serves the function of indicating the number of vehicles passing the detection point in unit time. The detector relay VR has a front contact 60 which momentarily grounds a terminal of the one-shot multivibrator 61 each time a vehicle passes the detector. Upon each grounding of this terminal, the one-shot multivibrator goes through a complete cycle of operation, being operated from its normal condition to an opposite condition for some fixed length of time and then restoring itself to its normal condition and remaining there until front contact 60 is again closed by a subsequent vehicle. The result then is that relay P which is picked up and maintained in that condition throughout the time that multivibrator 61 is in the abnormal state, is picked up for a uniform length of time for each individual vehicle, regardless of the length of time it takes for that vehicle to pass through the detection zone.

Back contact 62 of relay P is normally connected to ground so that zero input voltage normally is applied to the input of the three-section R-C filter which is identical to that illustrated in FIG. 3. However, upon the closure of front contact 60, the input terminal of this three-section filter is connected to (B+) so that a positive charging voltage is applied to the filter. Each time that relay P drops away, closing back contact 62, the various filter capacitors tend to discharge. Therefore, the control grid of tube 63 has applied to it a positive voltage which is proportional to the number of actuations of relay VR in a given time interval, and this voltage is proportional to the traffic volume, i.e., the number of vehicles per unit time.

The output circuit of cathode follower tube 63 is identical to that disclosed in FIG. 3. A meter 64 has its needle deflected by an amount directly proportional to the amplitude of voltage at the grid of tube 63. The scale of this meter is preferably not calibrated in terms of percentage but rather in terms of vehicles per minute or vehicles per hour as may be desired. A plurality of Schmitt trigger circuits are also selectively controlled by respective variable potentiometers connected in parallel in the cathode circuit in the same manner as in FIG. 3. Each of these trigger circuits controls a respective relay so that the relays R4–R6 may be selectively energized at different respective values of traffic volume. Their contacts may be used in any desired manner.

The traffic volume apparatus just described is that which would be associated with a particular lane of traffic. As with the traffic lane occupancy measuring apparatus of FIG. 3, it is desirable to obtain a composite figure which will represent traffic volume on the total of the adjacent lanes, such as lanes L-1 to L-3 in FIGS. 1A and 1B. To provide this, cathode follower tube 65 is shown as receiving an input to its control grid not only from the cathode circuit of tube 63 but also from the corresponding cathode circuits of the traffic volume apparatus for each of the other lanes to be monitored. The output circuit of this cathode follower 65 is organized in a manner identical to that for cathode follower 46 of FIG. 3. A meter 66 is provided and its indicator is deflected by an amount which represents the average of the inputs applied to the control grid of tube 65. Preferably, the scale of meter 66 is calibrated so that it will represent the total traffic volume on the individual lanes monitored. In other words, if the traffic volume on the three individual lanes being monitored is, respectively, $n_1$, $n_2$, and $n_3$ vehicles in unit time, then meter 66 is calibrated to read the sum of $n_1 + n_2 + n_3$ vehicles per unit time.

It should be understood that the present invention is also not to be limited to the particular apparatus shown for determining traffic volume. Instead, it is intended that the invention should embrace as well the method of obtaining traffic volume data which has been disclosed. This method comprises a first step which consists of obtaining a signal of uniform amplitude and duration for each vehicle passing the detector location, and then averaging and filtering the successive signals so received so that the resulting output signal has an amplitude proportional to traffic volume.

Figure 5:
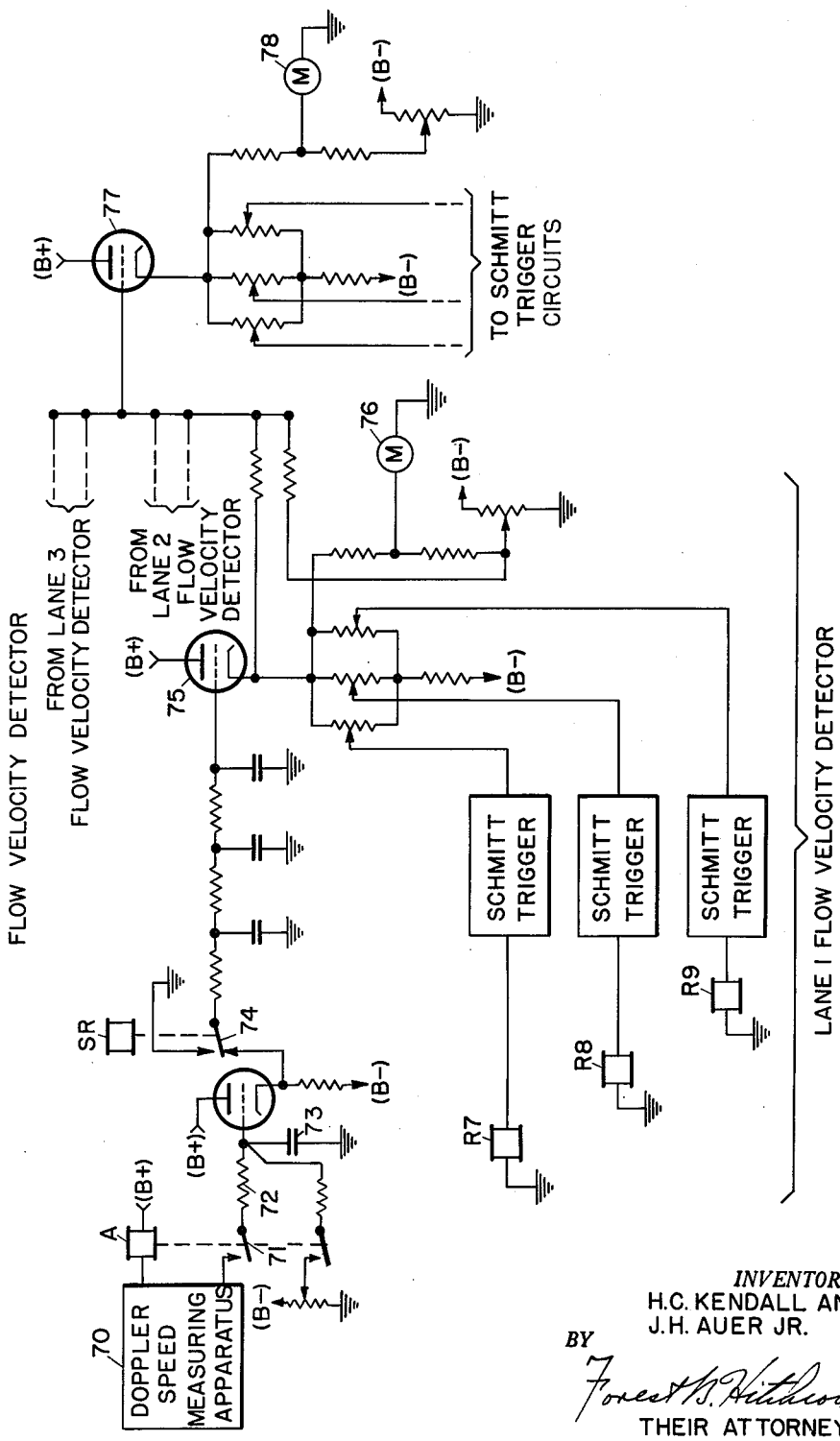
FIG. 5 illustrates the circuit for a "flow velocity" computer.

Flow velocity detector—FIG. 5

FIG. 5 illustrates the flow velocity detector. Doppler speed measuring apparatus 70 may be used to give the speed information for the individual vehicles, but it will be understood that other types of speed measuring apparatus may equally well be used, the only requirement being that an output signal be obtained whose amplitude is proportional to the velocity of each individual vehicle. When Doppler speed measuring apparatus is employed, a beam of steady sound energy may be directed from a transmitting transducer with a substantial component parallel to the direction of travel of the vehicles. For this purpose an additional transducer (not shown) may be added to those shown for each lane in FIGS. 1A and 1B. The shift in frequency that occurs in the signal reflected from a moving vehicle is detected upon its reception by a receiving transducer, and the amount of the frequency shift is proportional to the velocity of the vehicle. Since such Doppler speed measuring apparatus is well-known in the art, it need not be more fully described herein.

The output signal of the speed measuring apparatus 70 comprises a voltage whose amplitude is at all times proportional to the speed of a passing vehicle, but this voltage can be utilized to charge capacitor 73 through resistor 72 only when front contact 71 of relay A is closed. Relay A is operated in accordance with the amplitude of the signal reflected from the vehicle back toward the source of the transmitted sound beam. The operating value of relay A is selected so that the relay will pick up only when a vehicle is relatively close to the detector and drops away before the vehicle has passed out of the transmitted beam. When relay A is picked up, the speed signal can be fed through contact 71 to charge capacitor 73. Permitting the speed output signal of the speed measuring apparatus 70 to be used to charge capacitor 73 only when front contact 71 is closed prevents capacitor 73 from being affected except when there is a vehicle close to the detector location. Therefore, only a bona fide speed signal is applied as a charging voltage to capacitor 73 and any spurious signals which might result from vehicles that are some distance from the detection location and thus unable to give an accurate speed signal will be ignored. Also, the opening of front contact 71 before a vehicle has passed the detection location means that the last-obtained speed information is retained on capacitor 73 until another vehicle approaches whose speed can be determined and then stored in the capacitor. The additional input to the capacitor from the potentiometer provides negative voltage to the grid of the cathode follower sufficient to cancel the cathode follower bias such that the cathode voltage will be zero when the Doppler speed measuring apparatus output voltage is zero.

The speed information thus obtained is applied through a back contact 74 of the stoppage relay SR to the input of another three-section R-C filter and thence to the control grid of cathode follower tube 75. The voltage at this grid therefore is generally proportional to the average velocity of the vehicles passing the speed measuring apparatus 70. Where vehicles pass in close succession, the grid voltage quite closely represents the average velocity of such vehicles. However, where there is a relatively long interval between successive vehicles, the voltage at the grid of tube 75 tends to equal the voltage last obtained since it is this voltage that is then being stored in capacitor 73. In other words, where the vehicles are occurring with relatively long intervals between them, the voltage at the grid of tube 75 tends more to be proportional to the speed of the last-measured vehicle rather than the average speed of the various vehicles. When a stoppage occurs, relay SR picks up and causes the flow velocity to drop completely to zero even though the last vehicle may have had a speed of five miles per hour.

The output circuit of tube 75 is similar in all respects to that previously described in connection with FIGS. 3 and 4. Thus, a meter 76 is actuated in accordance with the amplitude of the grid voltage and may be calibrated in miles per hour to indicate thereby the traffic "flow velocity." As with FIGS. 3 and 4, a plurality of Schmitt trigger circuits is disclosed, each controlling a respective relay R7–R9. Each relay is operated from its normal condition upon the occurrence of a particular preselected value of voltage at the grid of tube 75 and its contacts may be used in any desired manner.

Meter 76 reads the flow velocity for a particular lane. When it is desired to obtain the flow velocity for the composite of the several adjacent lanes, the circuit of tube 77 may be provided. Tube 77 receives its input in part from the output of tube 75 and in a similar manner from the outputs of the cathode followers for the flow velocity detectors of the other lanes as well. Meter 78 then reads the average flow velocity of the several lanes.

Figure 6:
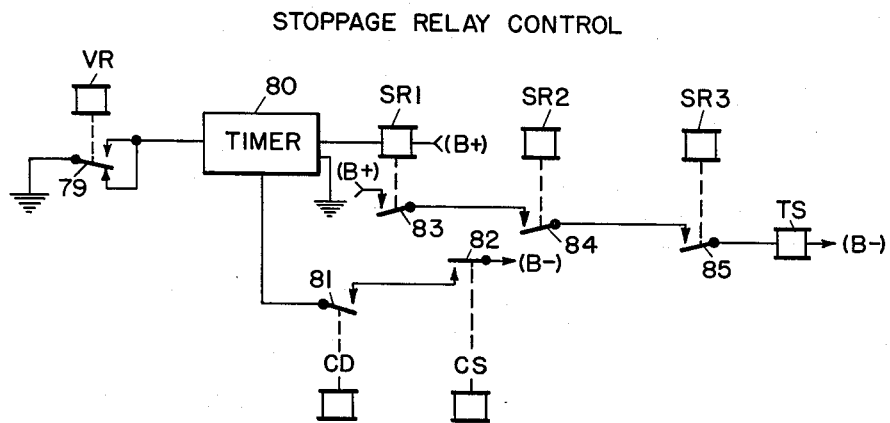
FIG. 6 illustrates apparatus for indicating the stoppage of traffic on a particular highway lane.

*Stoppage detection—FIG. 6*

FIG. 6 illustrates the manner in which the stoppage relay may be controlled. A timer 80 is provided which, under certain conditions, is energized and thereby set into operation. Normally, the energizing circuit is interrupted before the timer has had a chance to complete its timing operation. However, if the energizing circuit should not be interrupted so that the timer can complete its timing operation, then a circuit is completed by the timer which will permit energization of the stoppage relay SR1.

An energizing circuit for the timer is closed if front contact 81 of relay CD and back contact 82 of relay CS are both closed. Whenever this circuit is not complete, the timer is reset and deenergized. In addition, whenever vehicle relay VR changes position, either up or down, the crossover time of this relay provides a reset pulse to the timer. If this circuit can be maintained for a predetermined length of time without operation of the VR relay, the timer will complete its timing operation and, when it does, it will close a circuit which will permit relay SR1 to be energized from (B+) to ground and thereby indicate a stoppage of traffic in the respective lane. Of course, if there is no stoppage condition, then it can be expected that relay VR will be picked up and dropped away for each passing vehicle. The resultant actuation of contact 79 resets the timer 80 during the crossover time of this contact and thereby prevents the timer from completing its timing operation so that relay SR1 cannot be picked up.

A lack of actuations of the detector relay VR for some predetermined length of time is one characteristic of a traffic stoppage condition. Of course, the same thing appears under very light traffic conditions; for example, at certain times of the day, there may be no vehicle at all passing the detector location for quite a substantial time. It is not desired that this latter condition result in a completion of the timing operation for timer 80 so that relay SR1 will pick up. To prevent this, the relays CD and CS are provided and their contacts included in series connection in the energizing circuit and timer 80. The relays CD and CS are "critical lane occupancy" and "critical flow velocity" relays respectively. The critical lane occupancy relay may be one of the relays R1–R3 illustrated in FIG. 3 and may be selected to operate for a preselected high traffic lane occupancy. In a similar manner, the critical flow velocity relay CS may be one of the relays R7–R9 of FIG. 5. As long as traffic in the lane is generally moving with a velocity in excess of some predetermined maximum amount, this relay CS will be picked up but will drop away whenever the flow velocity for that lane is reduced below such value. As shown in FIG. 6, front contact 81 of the critical lane occupancy relay CD and back contact 82 of the critical flow velocity relay CS are connected in series in the timer energization circuit.

If the infrequent operation of relay VR is the result of light traffic conditions such that only an occasional vehicle passes along the highway, then relay CD will be dropped away because the traffic lane occupancy will be low, whereas relay CS will be picked up because the flow velocity will be reasonably high. Under these circumstances, there is no possibility of energizing the timer even though relay VR is not actuated for a long interval such that the contacts 81 and 82 will both be open. Incidentally, since the flow velocity detector retains the last-measured data as to flow velocity as already described, relay CS will, under these circumstances, remain picked up even in the absence of any additional vehicles traveling along the highway lane.

Even if the flow velocity should be reduced to the point where relay CS drops away, it will still be impossible to energize timer 80 if the traffic lane occupancy remains at a reasonably low value so that relay CD cannot pick up. Therefore, although traffic may be moving slowly because of inclement weather for example, as long as the traffic lane occupancy remains low, the timer cannot be energized and thus the stoppage relay cannot be actuated. It is only when there is a lack of actuations of the detector relay VR coupled with a low flow velocity as indicated by the release of relay CS and with high lane occupancy conditions as indicated by the picking up of relay CD that timer 80 can be energized and allowed to complete its timing operation and thereby permit a stoppage indication to be given. Under some circumstances it might be desirable to use only the CD or only the CS relay or a parallel combination of them in this circuit.

To obtain a composite picture of stoppage conditions in the various parallel and adjacent traffic lanes, a total stoppage relay TS is provided. This relay is energized when each of the individual stoppage relays for the respective lanes is energized. In other words, upon a total stoppage of traffic in all of the individual lanes, a circuit is then closed through the front contacts 83–85 of the individual stoppage relays in series to energize relay TS and thereby indicate that there is a total stoppage of traffic.

Figure 7:
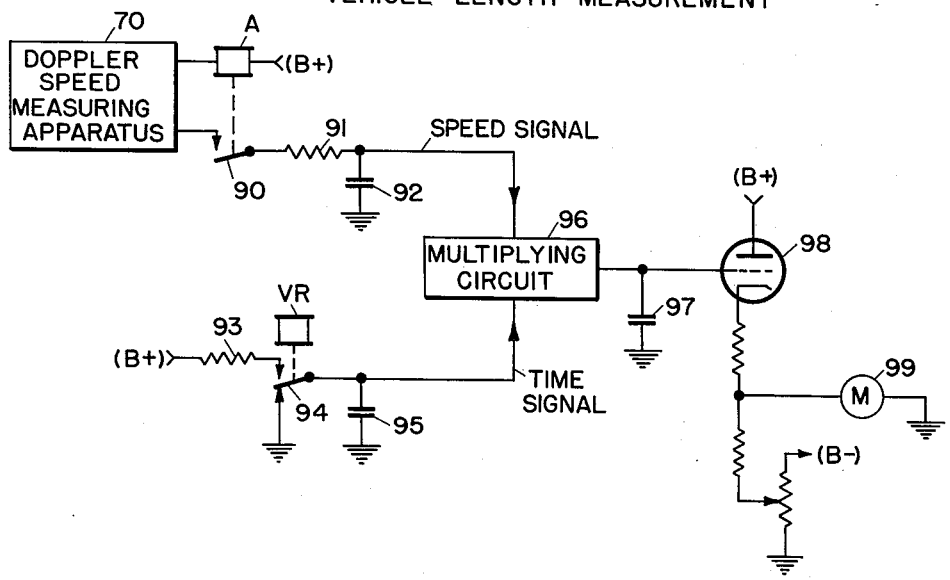
FIG. 7 illustrates the circuit for vehicle length measurement apparatus.

*Vehicle length measurement—FIG. 7*

FIG. 7 illustrates the manner in which it is possible to obtain data as to vehicle length. Vehicle length is obtainable by multiplying an analog of vehicle speed by another analog which is proportional to the length of time required for the vehicle to pass the detection point, i.e., length equals velocity multiplied by time. The analog of vehicle speed is readily obtainable by charging a capacitor to a voltage whose amplitude represents instantaneous vehicle speed past the detection point. Thus, capacitor 92 of FIG. 7 is charged through resistor 91 whenever front contact 90 of relay A is closed. Relay A is picked up only when the amplitude of the reflected Doppler signal obtained from the vehicle is above some predetermined minimum value. Thus, the voltage that is stored in capacitor 92 always represents the velocity of the last vehicle to pass the detector location.

Capacitor 95, on the other hand, is charged through front contact 94 of relay VR and through resistor 93 to (B+) each time that relay VR picks up. The amount of charge that is acquired by capacitor 95 is thus a function of the length of time that front contact 94 is closed and thus is proportional to the length of time required for the vehicle to pass the detection location. These two voltages, i.e., the voltages across capacitors 92 and 95, respectively, are applied as separate inputs to a multiplying circuit 96. This multiplying circuit may comprise an analog computer which produces an output voltage whose amplitude is proportional to the product of the two input voltages. This voltage appearing across capacitor 97 is applied to the grid of a cathode follower tube 98. The output circuit of this cathode follower tube is similar to those previously described so that meter 99 is deflected by an amount which is directly proportional to the voltage at the grid of tube 98. As a result, for each vehicle passing the detection point, and having its speed measured by the Doppler speed measuring apparatus 70, a reading may be obtained from meter 99, which represents the length of that vehicle. The scale of meter 99 may accordingly, be calibrated in terms of feet of length of vehicle.

Here, too, it should be understood that the invention is not to be limited to the specific means shown for obtaining length information of passing vehicles. In its broader aspects, the invention comprehends as well the method for obtaining vehicle length measurement which comprises obtaining a first analog having an amplitude proportional to the velocity of each vehicle as it passes the detection point, a second step of obtaining an analog whose amplitude is proportional to the length of time required for the vehicle to pass the detection point, and multiplying the two aforesaid analogs to provide a resultant analog whose amplitude is proportional to the length of the measured vehicle.

Figure 8:
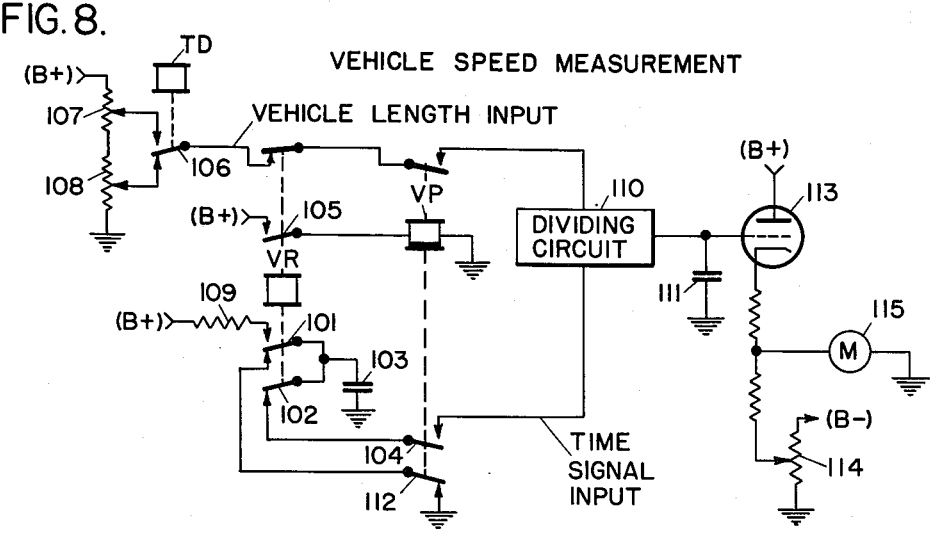
FIG. 8 illustrates the circuit for apparatus to be used in providing vehicle speed data.

Vehicle speed measurement—FIG. 8

FIG. 8 illustrates apparatus for measuring vehicle speed indirectly as a function of the length of a vehicle and the time required for it to pass the detection point. The apparatus makes use of the fact that a vehicle's speed may be obtained as a result of dividing an analog representing vehicle length by another analog proportional to time required for the vehicle to pass a given detection point.

The apparatus of FIG. 8 does not make use of an actual measurement of vehicle length to provide the required analog although this could, of course, be done. Instead, it uses an assumed vehicle length based upon a statistical average for typical traffic. Thus, a voltage is obtained from the variable tap of potentiometer 108 which is connected in series with potentiometer 107 between (B+) and ground, and this voltage is proportional to the length of average auto traffic. Although it is well recognized that all automobiles do not by any means have the same length, nevertheless, a statistical average may be employed which will give a close approximation of the speeds of successive vehicles even though the measurement obtained with respect to any particular vehicle may be in error.

It is, of course, also recognized that vehicles other than automobiles, such as motor trucks, have a length which is many times that of an average vehicle, and it is highly desirable that this discrepancy be taken into account. This is accomplished by separately detecting the passage of a truck and then arbitrarily increasing the analog of vehicle length to some higher value which will represent the average length of a truck. This selection is accomplished by a relay TD which is picked up whenever a truck passes the vehicle detecting location. The control for this relay TD will subsequently be described in connection with FIG. 9. Upon the picking up of relay TD, back contact 106 opens and front contact 106 closes so that the input to the dividing circuit 110 is then obtained from the variable tap of potentiometer 107 and a higher voltage analog is then applied to the dividing circuit which is proportional to average truck length.

The factor of time is again obtained by charging a capacitor 103 through a front contact of the vehicle relay VR and through resistor 109 to (B+). For each passing vehicle, therefore, capacitor 103 is charged to a voltage level which represents the length of time that front contact 101 was closed and the voltage is thus proportional to the length of time required for that vehicle to pass the detection point.

During the interval that capacitor 103 is being charged, no input is being applied to the dividing circuit to represent the time signal and the reason for this is that back contact 102 of relay VR is open at that time. A relay VP is provided which is energized through front contact 105 of that relay. This relay VP is provided with slow release characteristics as indicated by the heavy base line for the symbol designating this relay. Consequently, upon the release of relay VR after the vehicle has passed the detection point, there is a brief intervals after the opening of front contact 105 before relay VP will actually drop away. Throughout this interval, a circuit is completed from the upper terminal of capacitor 103 through back contact 102 of relay VR, and front contact 104 of relay VP, to the dividing circuit 110. For a brief interval, therefore, the voltage which was stored in capacitor 103 and which is proportional to the length of time it took the vehicle to pass the detection point is applied as an analog to the dividing circuit 110. The dividing circuit 110 produces an output voltage which is used to charge capacitor 111, and this output voltage has an amplitude which is proportional to the quotient obtained by dividing the analog of vehicle length by the analog of time. The usual cathode follower tube 113 has its control grid connected to the upper terminal of capacitor 111. Meter 115 connected in the cathode circuit of tube 113 then registers a needle deflection which is proportional to the grid voltage and thus represents vehicle speed. The usual negative biasing arrangement is provided in the cathode circuit by a potentiometer 114 which tends to offset the amount by which the cathode potential tends to exceed the grid potential, thereby permitting the meter to read zero when there is zero voltage applied to the control grid.

Use of the repeater relay VP makes it possible to apply the time signal analog to the dividing circuit only when it is fully established, i.e., after relay VR has dropped away so that capacitor 103 has had the opportunity to become charged to the maximum potential in accordance with the closure time of front contact 101. This prevents the application of a low initial value of the time signal to the dividing circuit 110 with a resulting inaccurately high output signal of the dividing circuit which would otherwise occur since the time signal is used as a divisor by the dividing circuit 110. In like manner the length signal is applied to the divider only during this short computing period.

When relay VR drops away in the manner previously described, its back contact 101 closes but capacitor 103 cannot discharge until relay VP has also dropped away and closed its back contact 112. At that time, a discharge circuit is completed so that capacitor 103 is fully discharged before the next successive vehicle is detected. In other words, the charge is fully maintained on capacitor 103 until such time as it is no longer of any effect upon the dividing circuit by reason of the opening of front contact 104.

Figure 9:
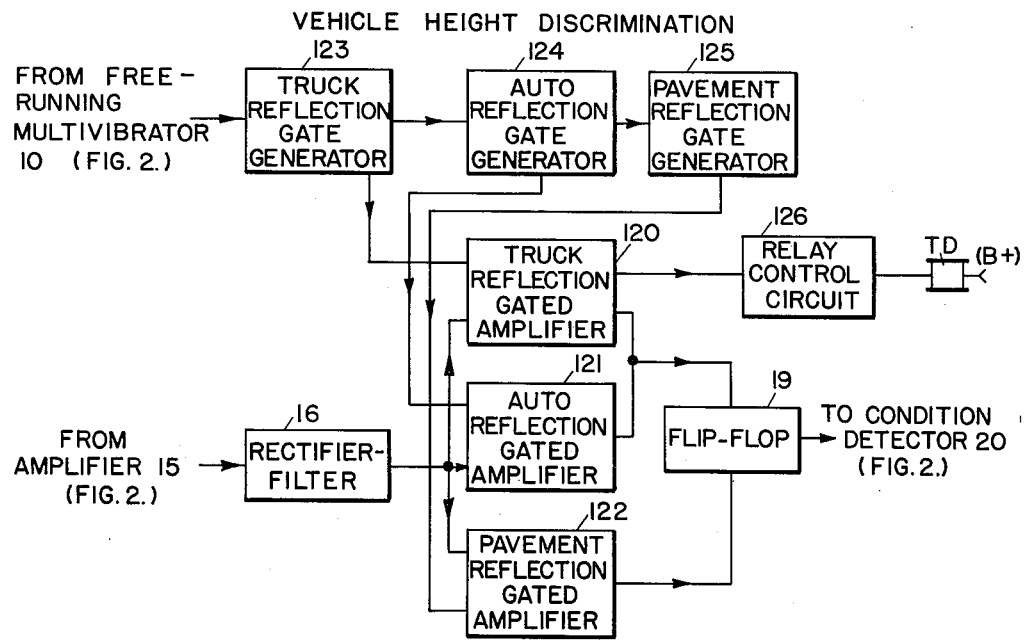
FIG. 9 illustrates in block diagram form how the vehicle detector of FIG. 2 may be modified to provide different outputs of vehicles of different height.

FIG. 9 illustrates how the vehicle detector of FIG. 2 may be modified to provide a separate output indication for each high vehicle passing the detector location. As mentioned in connection with FIG. 8, this data is useful in obtaining a characteristic representation of vehicle length.

FIG. 9 illustrates that the output of the free-running multivibrator 10 of FIG. 2 is applied to successive gating circuits. The first of these is the truck reflection gate generator 123 which produces a first gating voltage that encompasses the expected reception time of a truck reflection pulse. This gating voltage occurs relatively soon following the transmission of each sound pulse since the greater height of trucks causes a truck reflection to have a short round-trip propagation time. Another gate generator, referred to as the auto reflection gate generator 124, is provided and this generates another gating voltage which encompasses the somewhat later interval during which a reflection can be expected from the top of an automobile. This second gating voltage can be quite considerably delayed with respect to the truck reflection gating voltage because of the lower height of autos which causes the reflection pulse to have a considerably longer propagation time. The pavement reflection gate generator disclosed in FIG. 9 generates the usual pavement gate which encompasses the expected time of reception of a pavement reflection pulse.

The output of the amplifier 15 of FIG. 2 is applied to rectifier-filter 16 and then in parallel to the inputs of a truck reflection gated amplifier 120, an auto reflection gated amplifier 121, and a pavement reflection gated amplifier 122. These gated amplifiers 120–122 are gated respectively by the truck reflection gate generator 123, the auto reflection gate generator 124, and the pavement reflection gate generator 125.

Whenever a truck passes the detection location, an output is obtained from amplifier 120 for each repetitive pulse transmitted and each output is applied to the relay control circuit 126. When a predetermined plurality of such inputs have been obtained, the relay control circuit 126 is operated to a distinctive condition wherein it causes relay TD to pick up.

The reception of a reflection pulse having a longer propagation time and indicating that it is reflected from the top of a passing automobile produces an output from amplifier 121. Similarly, when no vehicle at all is present, amplifier 122 produces an output pulse. The outputs of both amplifiers 120 and 121 are applied in parallel to one input of flip-flop 19. The output of amplifier 122 is applied to the other input of flip-flop 19. Thus, flip-flop 19 is operated in exactly the same manner as described in connection with FIG. 2. The occurrence of reflection pulses from either automobiles or trucks will cause the flip-flop to be operated to a particular one of its two distinctive stable states and it will remain in such state until it receives repetitive inputs from aplifier 122 indicating that a vehicle has passed. The condition detector 20 is connected to the output of flip-flop 19 and is distinctively controlled according to the prevailing condition of flip-flop 19. The remainder of this circuit operates in a manner identical to that previously described for FIG. 2.

The present invention is intended to comprehend not only the specific apparatus shown for the direct measurement of vehicle speed but also the method employed. From the description already given, it can be seen that the method consists first of the step of obtaining an analog proportional to vehicle length, the further step of obtaining an analog proportional to the length of time required for each vehicle to pass the detection point, and dividing the first of said analogs by the second to obtain an output analog which is proportional to vehicle speed.

Having described in the foregoing specification methods and also apparatus for obtaining desired traffic data, we desire it to be understood that the apparatus shown is merely typical of that which may be constructed to practice the invention, and that various other forms, adaptations and alterations may be made without in any manner departing from the spirit or scope of this invention.

What we claim is:

1. Apparatus for measuring vehicular flow velocity comprising, a single vehicle speed measuring means responsive to each vehicle in sequence for producing in response to each vehicle detected a manifestation of its speed, means operatively connected to said speed measuring means for substantially continuously storing only the last-measured vehicle speed manifestation, and output means operatively connected to said storing means and continuously providing an output manifestation of vehicular flow velocity, said output means continuously and gradually varying said output manifestation in a direction toward the presently stored last-measured vehicle speed manifestation.

2. The apparatus as defined in claim 1 wherein said output means varies said output manifestation at a rate proportional to the difference between the last-measured vehicle speed manifestation and the present value of said output manifestation.

3. Apparatus for detecting traffic stoppage on at least one lane of highway comprising, at least one vehicle detector for detecting the presence of vehicles travelling along said lane, means operative to cause a distinctive manifestation only when the amount of traffic on said lane exceeds a predetermined value, means responsive at least in part to said detector for indicating traffic stoppage when said detector has not been operated for at least a predetermined interval which substantially exceeds the maximum expected non-operating time of said detector, said first-named means prohibiting operation of said responsive means to indicate traffic stoppage except when said first-named means has been operated to provide said distinctive manifestation.

4. Apparatus for measuring highway lane occupancy comprising, vehicle presence detector means defining a detection zone and demarcating for each vehicle detected a time interval which is proportional to the time that any part of such vehicle occupies said zone, signal accumulating means, means controlled by said detector means for incrementing adding in response to each vehicle detected to the existing value of signal stored in said signal accumulating means at a rate varying inversely with the present value of said manifestation and throughout the duration of said interval, means also controlled by said detector means for incrementally subtracting from the existing value of signal stored in said accumulating means at a rate proportional to the present value of said manifestation and throughout all intervals other than those demarcated by said detector means, and means responsive to the value of signal in said signal accumulating means.

5. The apparatus as set forth in claim 4 wherein said means for incrementally adding to the existing value of signal stored in said signal accumulating means adds at a rate proportional to the difference between the present value of said manifestation and a predetermined higher value.

6. The apparatus as set forth in claim 4 wherein said means for incrementally adding to the existing value of signal stored in said signal accumulating means adds an amount of signal for each vehicle detected which is substantially proportional to the time integral of the difference between the present value of said manifestation and a predetermined higher reference value which is representative of one hundred percent lane occupancy and with said integration taking place over the duration of the interval demarcated by said detector means.

7. Apparatus for indirectly measuring the speed of a vehicle passing a predetermined location comprising, first means for producing a first control manifestation representative of the length of said vehicle, said first means being capable of producing at least two distinct values of said first control manifestation corresponding respectively to different assumed vehicle lengths, and means governed by the passage of a vehicle according to its height to select a particular one of said values representative of vehicle length, second means for producing a second control manifestation representative of the length of time required for said vehicle to pass said detection location, and means for dividing said first control manifestation by said sceond control manifestation to thereby produce as a quotient a manifestation representative of the speed of said vehicle.

8. Apparatus for detecting traffic stoppage on at least one lane of a highway comprising, vehicle responsive means along said one lane, first means controlled by said vehicle responsive means and operated to a distinctive condition only when said vehicle responsive means has not been operated between its vehicle detecting and non-detecting conditions for at least a predetermined interval which substantially exceeds the maximum non-operating time of said vehicle responsive means, second means controlled by said vehicle responsive means for generating a signal representative of the percentage vehicle detection time of said vehicle responsive means and being operated to a distinctive condition when said percentage detection time exceeds a predetermined value, third means controlled by said vehicle responsive means and being operated to a distinctive condition only when the speed of traffic flow along said lane is less than a predetermined amount, and traffic stoppage indicating means for indicating traffic stoppage only when said first means and at least one of said second and third means have been operated to their respective distinctive conditions.

9. Apparatus for measuring traffic lane occupancy comprising in combination, means responsive to the presence of any portion of a vehicle in a given detection zone for generating a first signal having a predetermined higher amplitude through a time period substantially equalling the time required for said vehicle to pass through said zone but having a predetermined lower amplitude whenever no portion of said vehicle is in said detection zone, averaging means coupled to said responsive means for producing a second signal having an amplitude proportional to the average amplitude of said first signal, and measuring means distinctively controlled by said second signal according to its amplitude for measuring traffic lane occupancy.

10. Apparatus for measuring traffic lane occupancy comprising in combination, vehicle detector means controlled by the presence of each vehicle in a given detection zone for producing a distinctive first signal which is normally of a first preselected amplitude but which changes abruptly for each vehicle to a predetermined second amplitude for an interval substantially equal to the time said vehicle occupies said detection zone, circuit means electrically coupled to the output of said vehicle detector means for producing a second signal whose amplitude is proportional to the average amplitude of said first signal and means electrically coupled to the output of said circuit means and responsive to the amplitude of said second signal.

11. The apparatus as defined in claim 10 wherein said vehicle detector means includes an electromagnetic relay which is actuated to a distinctive condition for each vehicle and is controlled to remain in said distinctive condition for a time substantially equalling the time said vehicle remains in said detection zone, and means controlled by contacts of said relay for applying a voltage of a predetermined first amplitude to said circuit means whenever said relay is not in said distinctive condition and for applying a voltage of a different predetermined second amplitude whenever said relay is in said distinctive condition.

12. The apparatus as defined in claim 10 wherein said first signal of said vehicle detector is an electrical voltage having said preselected amplitude, said circuit means includes at least one series resistor and shunt capacitor, said vehicle detector means connecting said resistor and capacitor in series across said voltage source to charge said capacitor throughout each said interval, said vehicle detector means further connecting said resistor in shunt with said capacitor at all other times to discharge said capacitor.

13. The apparatus as defined in claim 12 which further includes a cathode follower having its grid-cathode circuit energized by the voltage across said capacitor, and also includes means connected in the cathode circuit of said cathode follower and being selectively controlled in accordance with the amplitude of the grid-cathode voltage of said cathode follower.

14. The apparatus as defined in claim 13 and further including a negative bias source of voltage for the cathode circuit of said cathode follower, said negative bias source providing a negative voltage component whose amplitude substantially equals the amount by which the voltage at the cathode of said tube is more positive than the voltage at its grid.

15. The method of measuring a highway traffic parameter which comprises the steps of:
(A) measuring a time interval for each vehicle as it passes a given detection zone which is at least in part inversely proportional to the speed of such vehicle in the detection zone;
(B) storing a signal having a value substantially proportional to said traffic parameter;
(C) adding signal to the stored signal and also subtracting signal from the stored signal for each vehicle detected in relative amounts dependent only on the ratio between, respectively,
 (1) the product of the difference in amplitude between the value of the signal then stored and a predetermined higher value, and the time interval measured in step (A), and
 (2) the product of the value of the then-stored signal, and the interval from the end of the time interval measured for said vehicle in step (A) until the next interval measured according to step (A) for the next-following vehicle.

16. The method of claim 15 wherein the time interval measured in step (A) is the time required for each vehicle to pass through said detection zone, whereby said highway traffic parameter is highway lane occupancy, and said predetermined higher value of signal is representative of one hundred percent lane occupancy.

17. The method of measuring highway lane occupancy which comprises the steps of:
(A) measuring the time required for a vehicle to pass through a given detection zone on said highway;
(B) storing a signal having a value substantially proportional to lane occupancy;
(C) adding signal to the stored signal for each vehicle detected in an amount substantially directly proportional to the difference between the existing value of the stored signal and a predetermined higher value of signal and also substantially directly proportional to the time interval measured in step (A); and
(D) subtracting signal from the stored signal for each vehicle detected in an amount substantially directly proportional to the value of the stored signal and substantially directly proportional also to the duration of the interval from the end of the time interval measured for said vehicle in step (A) until the next interval measured according to step (A) for the next-following vehicle.

18. Apparatus for measuring the traffic parameter of highway lane occupancy comprising in combination, vehicle detector means responsive to the passage of each of a plurality of vehicles for demarcating the time required for each vehicle traveling along said lane to pass through a given detection zone, means responsive to said vehicle detector means for generating a physical manifestation having a value substantially proportional to the percentage vehicle detection time of said vehicle detector means, means for storing the physical manifestation generated by said responsive means, and utilization means operatively connected to said storage means and differently responsive to different values of said physical manifestation stored in said storage means.

19. Vehicular flow velocity measuring apparatus comprising in combination, means for measuring the velocity of each vehicle as it passes a detection location and producing a first output signal whose amplitude is proportional to said velocity, storage means connected to said measuring means for storing said first output signal for each passing vehicle only until a further velocity signal is produced by said measuring means in response to a subsequent vehicle which passes said detection location, circuit means connected to said storage means for producing a second output signal whose amplitude substantially continually varies in a direction toward the value of the signal currently stored in said storage means, and measuring means connected to the output of said circuit means and distinctively controlled thereby so as to register flow velocity.

References Cited by the Examiner

UNITED STATES PATENTS

| | | | |
|---|---|---|---|
| 1,197,281 | 9/1916 | Freeman | 73—506 |
| 2,131,009 | 9/1938 | Hitchcock | 340—31 |
| 2,822,977 | 2/1958 | Gray | 235—196 |
| 2,859,916 | 11/1958 | Doll | 235—151 |
| 2,898,040 | 8/1959 | Steele | 235—151 |
| 2,925,583 | 2/1960 | Jeffers | 340—31 |
| 2,933,716 | 4/1960 | Soderberg | 235—151 |
| 2,954,462 | 9/1960 | Utt et al. | 340—38 |
| 2,959,958 | 11/1960 | Savet | 235—151 X |
| 2,987,704 | 6/1961 | Gimpel et al. | 235—151 X |
| 2,999,999 | 9/1961 | Bartelink | 235—151 |

FOREIGN PATENTS 958,793    5/1964    Great Britain.

MALCOLM A. MORRISON, *Primary Examiner.*

WALTER W. BURNS, Jr., *Examiner.*